United States Patent [19]
Schelkmann

[11] 3,970,131
[45] July 20, 1976

[54] TREAD FOR THE RECAPPING OF TIRES AND METHOD OF MAKING THE SAME
[75] Inventor: Wilhelm Schelkmann, Witten, Germany
[73] Assignee: Vakuum Vulk Holdings Ltd., Nassau, Bahamas
[22] Filed: May 24, 1974
[21] Appl. No.: 473,305

Related U.S. Application Data
[62] Division of Ser. No. 394,721, Sept. 6, 1973.

[30] Foreign Application Priority Data
Sept. 9, 1972 Germany............................ 2244391

[52] U.S. Cl.............................. 152/185; 152/196; 152/209 R
[51] Int. Cl.² ......................................... B60C 11/00
[58] Field of Search..................... 156/96, 129, 394; 152/176, 185, 187, 188, 209 R, 330 R, 354, 170, 173-175, 189, 196; 425/17, 20, 23

[56] References Cited
UNITED STATES PATENTS
2,609,026  9/1952  Caballero............................ 156/129
3,779,833  12/1973  Reppel.................................. 156/96

Primary Examiner—Drayton E. Hoffman
Attorney, Agent, or Firm—Michael J. Striker

[57] ABSTRACT

A tread for the recapping of tires is provided with a roughened internal surface simultaneously with the shaping of profile on its external surface in a vulcanizing form. The internal surface can be roughened by placing against the body of raw rubber in the form of a latticework, a plate with regularly or irregularly distributed projections or a composite deforming structure. The internal surface of the prefabricated tread can be sealed from the atmosphere by a foil which is applied to the internal surface directly in the form or subsequent to removal of tread from the form.

17 Claims, 14 Drawing Figures

TREAD FOR THE RECAPPING OF TIRES AND METHOD OF MAKING THE SAME

This is a division, of application Ser. No. 394,721 filed Sept. 6, 1973.

BACKGROUND OF THE INVENTION

The present invention relates to a method of making treads for the recapping of tires. The invention also relates to treads which are produced in accordance with the improved method.

It is well known that the internal surface of a tread must be roughened prior to bonding to the carcass of a used tire, either directly or with the interposition of a conventional intermediate layer or insert which is placed between the internal surface of the tread and the peripheral surface of the carcass. As a rule, the internal surface of a prefabricated tread is roughened shortly prior to bonding to a carcass or to an intermediate layer in order to avoid oxidation of the material of the tread along the uneven internal surface. The internal surface of the intermediate layer can be subjected to an analogous treatment prior to placing it against the peripheral surface of the carcass.

When a prefabricated tread is to be bonded to the carcass of a used tire, its internal surface is roughened for two reasons, i.e., to remove the oxidized layer of material along the internal surface and to enhance the bonding action during vulcanizing. This insures that raw rubber which is exposed along the roughened internal surface adheres strongly to the peripheral surface of the carcass when the recapping operation is completed. If the tread consists of widely different materals, or if the materials of the tread and carcass are different, the internal surface of the tread is normally subjected to a very pronounced roughening action so as to greatly increase the overall area of the internal surface by imparting to such internal surface a pronouncedly coarse finish which contributes to a superior bonding action and reduces the likelihood of cracking in the regions of transition between different material types.

It was further proposed to roughen the internal surface of a prefabricated tread immediately after the making. The freshly roughened internal surface is then coated with a layer of adhesive and is overlapped by a suitable foil which seals the roughened internal surface from the surrounding atmosphere. However, the roughening of the internal surface still represents a separate step which must be carried out upon completion of the prefabricated tread and contributes significantly to the manufacturing cost. Moreover, the roughening of successive treads is not reproducible with a requisite degree of accuracy, especially if the roughening action is to produce relatively narrow recesses and small protuberances which cannot be machined at an acceptable cost. Thin treads cannot be properly roughened in presently available machinery; therefore, the roughening is often performed by hand, especially in regions which cannot be readily reached by machine tools.

It was further proposed to vulcanize a tissue onto the internal surface of a prefabricated tread, especially a tread for large (tactical, combat and analogous) tires. The tissue is forcibly removed prior to bonding of the tread to the carcass of a tire. A drawback of such proposal is that the tissue can be applied only to relatively large and thick treads because the removal of tissue necessitates the exertion of a very large force which must be furnished by a suitable machine. Furthermore, the depth of recesses and the height of protuberances on the internal surface of the tread subsequent to removal of the tissue is relatively small so that the bonding action between the tread and the carcass is not satisfactory.

SUMMARY OF THE INVENTION

An object of the invention is to provide a novel and improved method of producing a tread for the recapping of used tires according to which the roughening of the internal surface of the tread is completed simultaneously with completion of the tread.

Another object of the invention is to provide a novel and reproducible mode of roughening the internal surfaces of prefabricated treads.

A further object of the invention is to provide a novel and improved prefabricated tread for the recapping of tires.

Still another object of the invention is to provide a tread whose internal surface is roughened as soon as the tread is removed from the form and whose internal surface can be configured in a manner to insure the formation of an optimum bond between the internal surface and the peripheral surface of a carcass.

An additional object of the invention is to provide a novel and improved apparatus for the making of prefabricated treads.

A further object of the invention is to provide novel and improved means for imparting to the internal surface of a tread a desired configuration.

The method of the present invention can be resorted to for the making of storable sections of or circumferentially complete treads which are used in the recapping of tires. The method can be practiced by employing a vulcanizing form whose bottom wall has an outline which is complementary to the desired profile of the external surface of the tread, and the method comprises the steps of introducing into the form an effective amount of raw rubber which forms in the form a layer having an exposed surface corresponding to the internal surface of the tread and a concealed surface which is adjacent to the bottom surface of the form and corresponds to the profiled exposed surface of the tread, pressing against the exposed surface of the layer of raw rubber a deforming structure or pattern having a plurality of regularly or randomly distributed projections and recesses to impart to the exposed surface of the layer a complementary configuration, and converting the layer into a prefabricated tread. The converting step comprises heating the layer so that the raw rubber flows and the prefabricated tread is provided with an external surface having a profile complementary to the profile of the bottom surface of the form, and with an internal surface whose configuration is complementary to that of the deforming structure.

The method may further comprise the step of applying over the internal surface of the prefabricated tread a deformable protective sheet (e.g., a foil of synthetic plastic material) which loosely follows the configuration of the internal surface and seals it from the surrounding atmosphere.

Alternatively, the method may comprise the step of placing between the deforming structure and the exposed surface of the layer in the form a deformable sheet or foil which adheres to and closely follows the configuration of the internal surface of the prefabricated tread to seal the internal surface from the surrounding atmosphere.

The method preferably further comprises the step of evacuating air from the form in the course of the converting step.

The deforming structure may constitute a latticework or a plate having projections and recesses, and such structure may be assembled of two or more separable parts. The internal surface of the tread may have the configuration of sand paper and the projections and/or recesses of the deforming structure may have portions of different height, width and/or length. At least some projections of the internal surface of the tread may be dovetailed (undercut).

The novel features which are considered as characteristic of the invention are set forth in particular in the appended claims. The improved tread itself, however, both as to its construction and the mode of producing the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
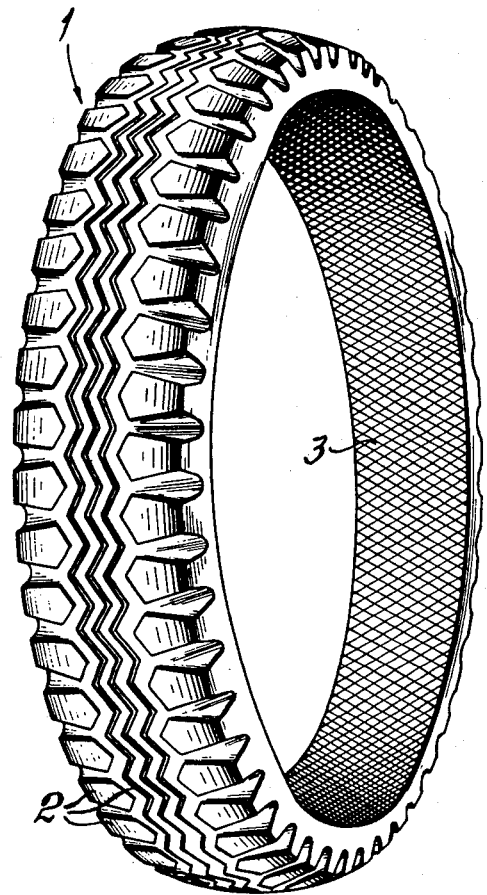
FIG. 1 is a perspective view of a prefabricated tread whose internal surface is configured in accordance with a first embodiment of the invention.
Figure 2:
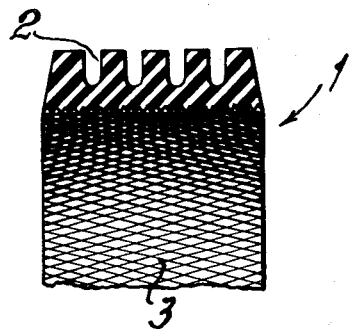
FIG. 2 is a sectional view of the tread shown in FIG. 1.

FIGS. 1 and 2 illustrate a prefabricated tread 1 whose external surface 2 has a suitable profile and whose internal surface 3 is roughened in accordance with the method of the present invention. The pattern which is impressed into the internal surface 3 resembles a latticework, i.e., it comprises intersecting projections or ribs surrounding recesses of polygonal outline. Such latticework represents but one of many patterns or configurations which can be provided on the internal surface 3 of the tread; other patterns include those having pits or scars, naps, truncated cones, crepe-like surfaces, projections in the form of pushbuttons or dovetailed and similarly undercut protuberances. All that counts is to provide the internal surface 3 with regularly or irregularly distributed raised and recessed portions in the form of discrete or interconnected projections and grooves or recesses, identically or differently configurated protuberances and cavities, or regular or irregular combinations of such configurations so as to insure the formation of a reliable bond when the internal surface 3 of the tread 1 is permanently secured to the carcass of a used tire. In contrast to the presently followed procedure of roughening the internal surface of a tread subsequent to making of the tread, the method of the present invention contemplates to produce the tread in such a way that the internal surface of the tread is roughened as soon as the making of the tread is completed, i.e., that the roughening of internal surface constitutes one or more steps of the tread-making process. This insures a much more reliable reproducibility of the formation of patterns or configurations on the internal surfaces of successively produced treads and reduces the likehood of unsatisfactory roughening due to lack of experience and/or lack of conscientiousness on the part of the workmen.

Figure 3:
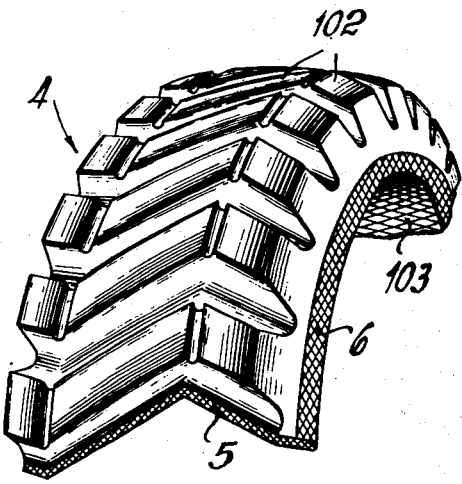
FIG. 3 is a perspective view of a segment of a prefabricated tread for use on tractors, trucks or analogous vehicles.
Figure 4:
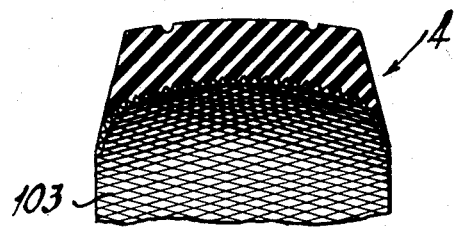
FIG. 4 is a sectional view of the segment shown in FIG. 3.

FIGS. 3 and 4 illustrate an arcuate portion or segment 4 of a prefabricated tread whose external surface 102 has a profile corresponding to that of a tactical or combat tire. The profile consists of relatively large ribs separated by relatively wide recesses or grooves, such as are customary on agricultural vehicles, conveyances used in quarries, mines and elsewhere where the tires are subjected to very pronounced wear. The internal surface 103 of the segment 4 exhibits a pattern consisting of very pronounced projections or protuberances and recesses or cavities to insure a highly satisfactory bonding to the carcass. The side faces 6 and the end faces 5 of the segment 4 are also roughened, preferably in the same way as the internal surface 103. This insures satisfactory bonding to the end faces of similar arcuate segments and to layers which are applied against the side faces 6 prior to vulcanizing of the tread to a tire carcass.

Figure 5:
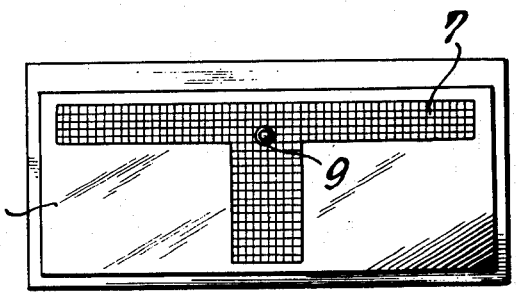
FIG. 5 is a plan view of a receptacle which can be used for the application of foils to prefabricated treads.

FIG. 5 illustrates a receptacle or bag 10 which serves to provide the roughened internal surface of a prefabricated tread with a protective layer consisting of a suitable flexible material, such as a plastic foil which closely follows the configuration of the internal surface and is applied thereto by simultaneous evacuation of air so that the foil constitutes a seal which protects the roughened internal surface from contact with the surrounding atmosphere. The tread is introduced into the receptacle 10 upon completed conversion of a mass of raw rubber into a body having profiled internal and external surfaces, such as the surfaces 2, 3 of the tread 1 or the surfaces 102, 103 of the segment 4. FIG. 5 shows the configuration (latticework) of the internal surface 7 of a tread in the receptacle 10; such configuration has been imparted to the surface 7 by a deforming structure of the type shown in FIG. 6 or by an analogous deforming structure which was caused to contact and to deform the exposed surface of a body of raw rubber in a mold whose bottom surface has a configuration complementary to the desired profile of the external surface of the tread. The recesses which are formed by the bars of the deforming structure can be used to facilitate the evacuation of air from the space between the foil and the internal surface 7 of the tread in the receptacle 10. The outlet for evacuation of air from the receptacle is shown at 9. The application of a foil to the exposed surface 7 in an airtight manner prevents oxidation of the internal surface during the interval following the making of the tread and preceding the bonding of the internal surface 7 to the carcass of a tire. The foil which adheres to the internal surface 7 can be readily peeled off by hand immediately prior to bonding of the tread to a carcass.

The receptacle 10 can further serve for storage of one or more prefabricated treads prior to vulcanizing to carcasses. Thus, the treads are placed into the receptacle, the latter is thereupon evacuated by way of the outlet 9, and the outlet is sealed to prevent any contact between the internal surfaces of the confined treads and the atmosphere.

Figure 6:
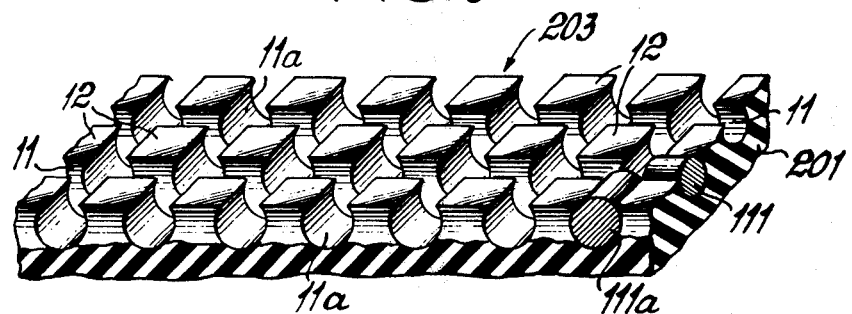
FIG. 6 is a fragmentary perspective view of a further tread.
Figure 7:
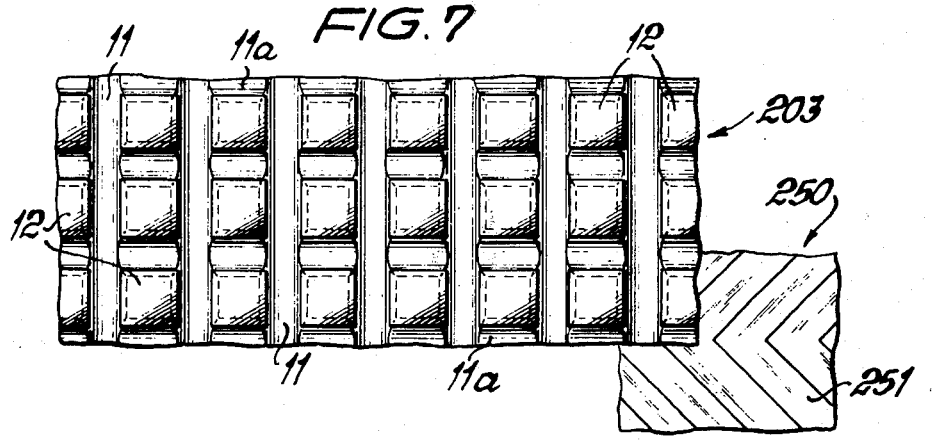
FIG. 7 is a plan view of the structure shown in FIG. 6.
Figure 13:
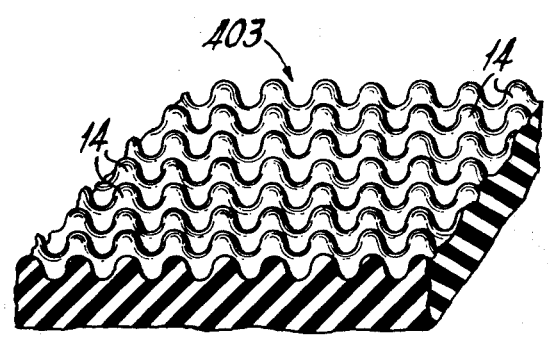
FIG. 13 is a fragmentary perspective view of a further tread.
Figure 9:
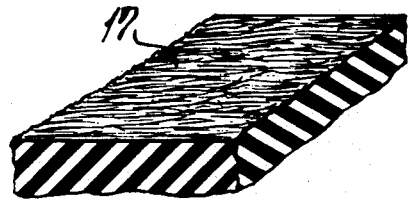
FIG. 9 is a fragmentary perspective view of another tread.

FIGS. 6 and 7 illustrate the configuration of the internal surface 203 of a further prefabricated tread 201. The internal surface 203 is formed with longitudinally and transversely extending recesses or channels 11, 11a which surround rectangular projections in the form of platforms 12. The configuration shown in FIGS. 6 and 7 is imparted to the surface 203 by a latticework of coplanar longitudinally and transversely extending metallic rods or wires 111, 111a (only one of each of these rods is shown in part in FIG. 6. The rods 111, 111a are recessed into the layer of raw rubber to such an extent that the depth of each recess 11, 11a is less than the diameter of a rod 111 or 111a but exceeds the radius of such rod. In other words, the width of the recesses 11, 11a at the level of the exposed top faces or projections 12 is less than the width of channels below such top faces. It can be said that portions of the projections 12 are undercut or that the projections are dovetailed; a feature which has been found to contribute significantly to satisfactory bonding of the tread 201 to a tire carcass. Care should be exercised to prevent the material of the tread 201 from overflowing the rods 111, 111a because this would create difficulties during separation of rods from the tread.

FIG. 7 further shows a portion of a form 250 having a bottom surface 251 whose profile is complementary to the desired profile of the tread 201.

Figure 8:
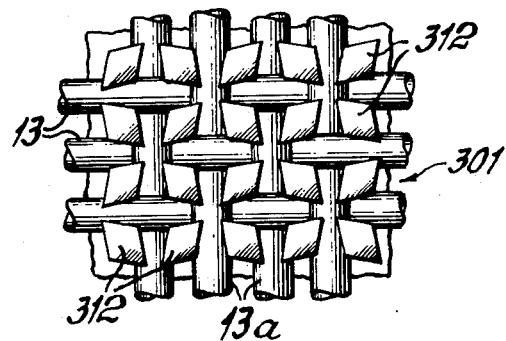
FIG. 8 is a plan view of a tread which constitutes a modification of the tread shown in FIG. 6.

FIG. 8 shows a portion of a freshly finished tread 301 prior to removal from the form, not shown. The deforming means for imparting a specific configuration to the internal surface of the tread 301 comprises a modified latticework of interwoven metallic rods or bars 13 and 13a which produce in the internal surface recesses or channels having portions of different depths, i.e., the depth of each channel is greatest in the region where a vertical channel (as viewed in FIG. 8) intersects a horizontal channel. Moreover, the utilization of such latticework results in the formation of differently oriented projections or protuberances 312. The configuration of FIG. 8 has been found to be even more satisfactory for effective bonding to a tire carcass than the configuration shown in FIGS. 6 and 7.

The configuration of the internal surface of the tread 301 shown in FIG. 8 can be altered by using rods 13 and 13a of different diameters, for example, larger-diameter horizontal rods 13 and smaller-diameter vertical rods 13a, or alternating larger- and smaller-diameter horizontal and/or vertical rods. Additional variations in the configuration of the internal surface of the internal surface of the tread can be achieved by changing the distance between neighboring rods, either in accordance with a certain pattern or at random. An advantage of rods having different diameters is that they cause the formation of channels or recesses having different depths irrespective of whether the rods are coplanar (FIGS. 6–7) or interlaced in a manner as shown in FIG. 8. It has been found that the strength of the bond between the tread and the carcass improves if the depth and/or shape of the channels, grooves, recesses, cavities, projections, protuberances and/or analogous parts of the internal surface varies within a wide range.

Figure 10:
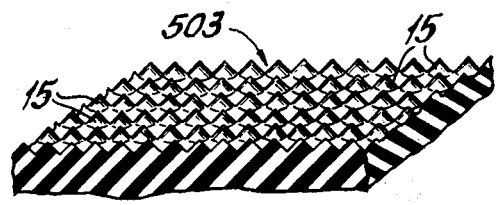
FIG. 10 is a fragmentary perspective view of a further tread.
Figure 11:
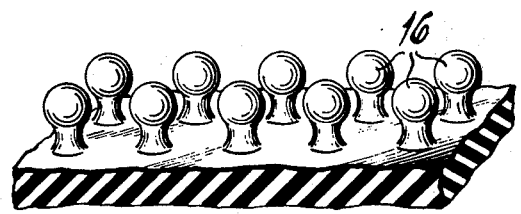
FIG. 11 is a fragmentary perspective view of still another tread.
Figure 12:
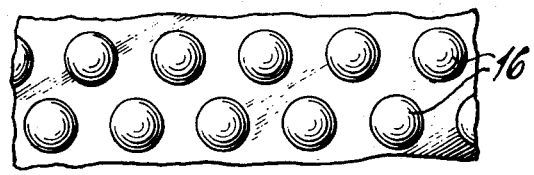
FIG. 12 is a plan view of the structure shown in FIG. 11.

FIGS. 9 to 13 illustrate additional advantageous configurations for the internal surface of the improved tread. The surface 403 of FIG. 13 has rounded projections 14 of substantially semispherical shape. The projections 15 of the internal surface 503 shown in FIG. 10 are of conical shape with rounded tips. FIGS. 11 and 12 show pushbutton-shaped projections 16 each of which resembles the major part of a sphere. The internal surface 17 of the tread shown in FIG. 9 has a crepe-like configuration. These are but a few of many configurations which can be used on the internal surface of the improved tread to enhance the bond between the carcass and the tread. All that counts is to provide the internal surface of the tread with raised and recessed portions during the making of the tread so that the finished product need not be roughened prior to vulcanizing to a tire. The depth of recessed portions and the height and other dimensions of the projections will depend also on the intended use of the recapped tire.

The configurations shown in FIGS. 8, 11 and 12 are especially suited for treads of tires which are used on agricultural vehicles or the like. The recesses of the type shown in FIG. 8 are particularly satisfactory on treads which must stand substantial transverse stresses. The surface 17 of FIG. 9 can be formed by resorting to a deforming means having the configuration of sand paper. Such configuration can also be obtained by using deforming means in the form of a metallic plate which is provided with randomly distributed hardened droplets of a suitable metal. The cover of the form 250 can serve as a deforming means.

It will be noted that the improved prefabricated tread is characterized by an internal surface which is provided with molded projections or protuberances and recesses, i.e., that the formation of such projections and recesses takes place simultaneously with the profiling of the external surface in a mold or matrix. The projections may be dovetailed (FIGS. 6 to 8), button-shaped (FIGS. 11 and 12) or otherwise configurated (FIGS. 9, 10, 13), and the recesses may have portions of different width, length and/or depth (see, for example, FIG. 8). The ratio of that portion of the internal surface which is provided with recesses to that portion of the internal surface which is provided with projections is preferably (but not necessarily) one-to-one.

Figure 14:
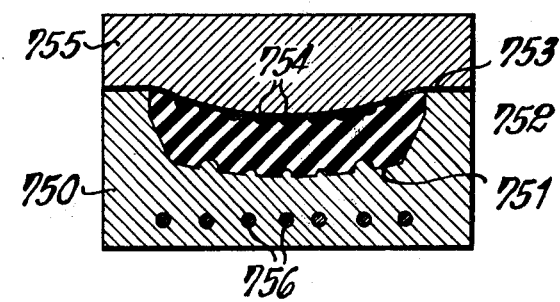
FIG. 14 is a sectional view of an apparatus for the making of the improved tread.

FIG. 14 shows a form 750 having a profiled bottom surface 751 and containing an effective amount of raw rubber 752 which is to be converted into a prefabricated tread (e.g., the tread 1 of FIGS. 1 and 2). A pressure-resistant foil 753 is placed on top of the body 752 and a latticework 754 consisting of metallic rods or wires is placed on top of the foil 753. The form 751 is then closed by a cover 755 and heat is supplied via coils 756 to vulcanize the body 752. The cover 755 is thereupon removed prior to removal of the latticework 754. The foil 753 adheres to the internal surface of the prefabricated tread to prevent oxidation and is removed immediately prior to bonding of the tread to a carcass.

The latticework 754 can consist of two or more discrete portions. Moreover, this latticework can be replaced by deforming means in the form of a plate having conical, button-shaped or otherwise configurated projections, depending on the desired configuration of the internal surface of the prefabricated tread. The closing of the cover 755 is preferably accompanied by forcible introduction of the foil 753 and a portion of the latticework 754 into the exposed upper surface of the body 752 and by simultaneous expulsion of air from the space between the body 752 and foil 753. The heating action is sufficient to cause the material of the body 752 to flow and to completely fill the recesses in the bottom surface 751 as well as to be provided with a desirable internal surface whose configuration is determined by the latticework 754.

The method which has been described in connection with FIG. 14 exhibits the advantage that the foil 753 is secured to the prefabricated tread immediately in the form 750; however, the separation of foil 753 from the tread necessitates the exertion of a much greater force than that which is needed to separate the foil described in connection with FIG. 5.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended:

1. As a novel article of manufacture, a prefabricated tread for use in tire-recapping methods of the type wherein a bonding layer of unvulcanized rubber is inserted intermediate and pressed between the inner surface of a prefabricated tread and the outer surface of a tire carcass at a temperature high enough to cause the unvulcanized rubber of the bonding layer to flow into intimate contact with said surfaces and become vulcanized to effect permanent bonding of the prefabricated tread to the carcass, the novel prefabricated tread being a molded one-piece structure having a profiled external road-engaging surface and having an internal surface substantially completely covered with a crowded network of molded projections and recesses presenting to the unvulcanized rubber of such a bonding layer a large contact surface and a multitude of cavities into which the unvulcanized rubber of such a bonding layer can flow during the performance of such permanent-bonding method.

2. A prefabricated tread as defined in claim 1, wherein said molded projections and recesses of said network of molded projections and recesses are arranged in rows extending transversely to the elongation of the prefabricated tread.

3. A prefabricated tread as defined in claim 1, wherein said molded projections and recesses of said network of molded projections and recesses are arranged in rows extending generally parallel to the elongation of the prefabricated tread.

4. A prefabricated tread as defined in claim 1, wherein said molded projections and recesses of said network of molded projections and recesses are arranged in rows extending transversely to the elongation of the prefabricated tread and in columns extending generally parallel to the elongation of the prefabricated tread.

5. A prefabricated tread as defined in claim 1, wherein said network of molded projections and recesses is comprised of a multitude of molded projections so configurated as to define a multitude of intermediate recesses of undercut cross-sectional configuration.

6. A prefabricated tread as defined in claim 1, wherein said network of molded projections and recesses is comprised of a multitude of molded projections so configurated as to define a multitude of intermediate recesses having, as considered in direction transverse to the elongation of the prefabricated tread, an undercut cross-sectional configuration.

7. A prefabricated tread as defined in claim 1, wherein said network of molded projections and recesses is comprised of a multitude of molded projections so configurated as to define a multitude of intermediate recesses having, as considered in direction generally parallel to the elongation of the prefabricated tread, an undercut cross-sectional configuration.

8. A prefabricated tread as defined in claim 1, wherein said projections are of dovetail-shaped cross-sectional configuration.

9. A prefabricated tread as defined in claim 1, wherein said projections are hemispherical.

10. A prefabricated tread as defined in claim 1, wherein said projections are button-shaped.

11. A prefabricated tread as defined in claim 1, wherein the ratio of that portion of said internal surface provided with said projections to that portion of said internal surface provided with said recesses is approximately one-to-one.

12. A prefabricated tread as defined in claim 1, wherein said recesses have portions of different depth.

13. A prefabricated tread as defined in claim 1, wherein said recesses have portions of different length.

14. A prefabricated tread as defined in claim 1, wherein said recesses have portions of different width.

15. A prefabricated tread as defined in claim 1, wherein said recesses have portions of different length and width.

16. A prefabricated tread as defined in claim 1, wherein said crowded network of molded projections and recesses has a generally crepe-like texture.

17. A prefabricated tread as defined in claim 1, wherein the shapes of said recesses are negative cylinders oriented both transverse to and generally parallel to the direction of elongation of the prefabricated tread.

* * * * *